United States Patent [19]

Stephens

[11] 4,201,799

[45] * May 6, 1980

[54] REFINISH PAINTING APPARATUS

[76] Inventor: Charles E. Stephens, 10037 Dixie Hwy., Anchorville, Mich. 48004

[*] Notice: The portion of the term of this patent subsequent to Dec. 30, 1992, has been disclaimed.

[21] Appl. No.: 954,907

[22] Filed: Oct. 26, 1978

Related U.S. Application Data

[63] Continuation of Ser. No. 754,229, Dec. 27, 1976, abandoned.

[51] Int. Cl.² .................................................. C09J 7/04
[52] U.S. Cl. .................................. 427/142; 427/208.4; 427/208.6; 427/282; 427/372.2; 427/285; 427/421; 427/287; 428/124; 428/195; 428/343; 428/174; 428/40; 428/41
[58] Field of Search .................... 427/142, 207 R, 282, 427/285, 287, 331, 372 R, 421, 140, 207 B, 207 C; 428/124, 174, 189, 191, 195, 211, 343, 537, 906, 43, 40, 41

[56] References Cited

U.S. PATENT DOCUMENTS

| | | | |
|---|---|---|---|
| 1,779,588 | 10/1930 | Doty et al. | 428/191 |
| 2,755,196 | 7/1956 | Scholl | 428/343 X |
| 3,930,069 | 12/1975 | Stephens | 427/142 |

Primary Examiner—George F. Lesmes
Assistant Examiner—R. Eugene Varndell, Jr.
Attorney, Agent, or Firm—Burton, Parker & Schramm

[57] ABSTRACT

Described is a masking tape adapted for use in defining a selected portion of a surface for refinish spray painting wherein the masking tape is applied to a peripheral portion of the selected surface portion with a lateral portion of the tape being angled upwardly from the surface to form an included angle within the range of approximately 15° to approximately 45°, the masking tape comprising a backing formed from a selected material being creasable to facilitate formation and maintenance of the included angle, adhesive material being applied to one lateral portion on one side of the tape, the width of the adhesive portion of the adhesive coated lateral portion being selected to insure adhesion of the tape to the surface to be refinished, the opposite lateral portion of the one side of the tape being adhesive-free whereby the adhesive-free portion of the tape may be angled upwardly from the adhesive coated portion of the tape to form the included angle with the surface to be refinished, the creasable character of the tape backing serving to maintain the included angle, wherein the tape is scored on at least one side along a line forming a juncture between the adhesive-free and the adhesive coated lateral portions.

Also described is a tape dispenser for scoring and cutting the masking tape.

1 Claim, 8 Drawing Figures

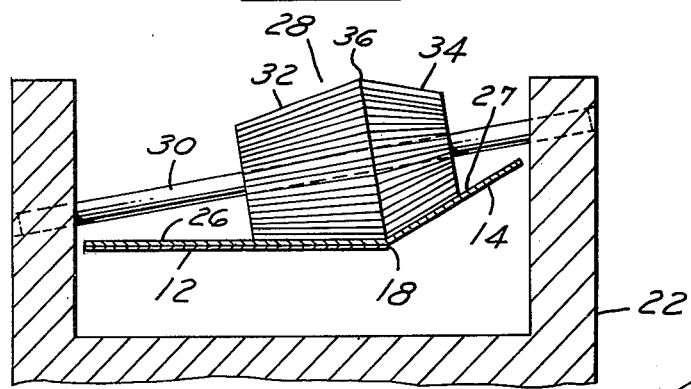
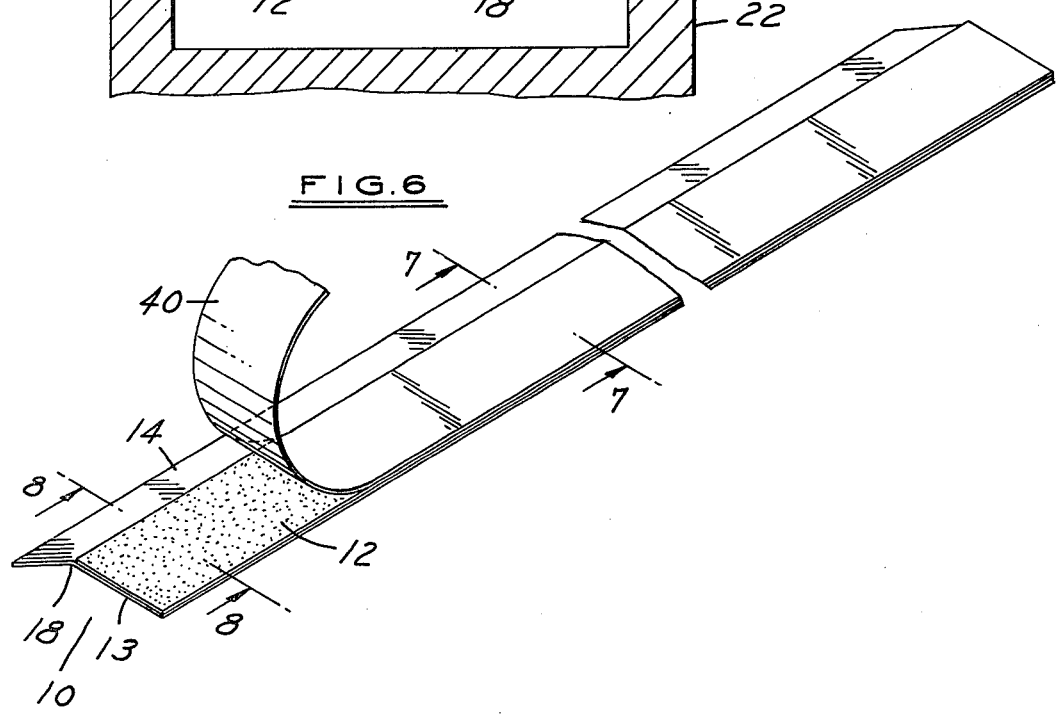
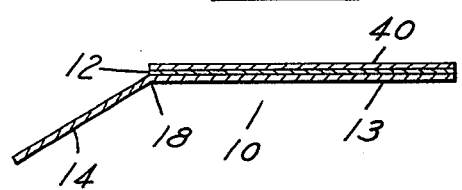
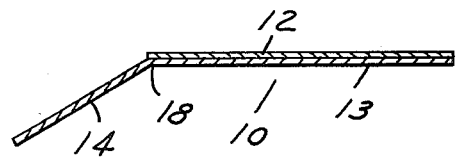

REFINISH PAINTING APPARATUS

This is a continuation, of application Ser. No. 754,229, filed Dec. 27, 1976, now abandoned.

BACKGROUND OF THE INVENTION

The present invention relates to a specially configured masking tape adapted for use in refinish painting and more particularly to such a masking tape adapted to include adhesive coated and adhesive-free lateral portions along its length with the adhesive-free portion of the tape being angled upwardly from a panel to be refinished by spray painting.

The term refinish painting is used herein to include painting of any surface, a portion of which requires refinishing. A previously painted surface may require refinishing because of a paint flaw or due to working or finishing of the surface substrate, for example, a metal or plastic surface.

Refinish painting is commonly employed in the manufacture of vehicles. Such vehicles have numerous surface panels which are painted and which require a high quality finish for appearance. In factories producing such vehicles, it is common to employ refinish painting for relatively large proportions of the panel surfaces or complete panels for the vehicle.

Usually, when refinishing a portion of the surface of such a vehicle or the like, an entire panel has normally been repainted in the prior art to avoid the presence of a linear juncture or seam between the refinish painting surface and an original painted surface on a given panel. Accordingly, excessive quantities of paint are employed for refinish painting relative to the actual amount of surface area which is actually flawed and requires refinishing.

This problem is particularly present in connection with the use of enamel paints which tend to be applied in relatively thick layers at least compared to other types of paints such as lacquers for example. The thickness of a single enamel layer or coat is sufficient to cause a noticeable seam or juncture between a repainted surface portion and the original painted surface.

The problem noted above is particularly severe when enamel paints are being used upon vehicles or the like because of the very large surface areas on all of the vehicles produced by a factory. With refinish paint being applied to entire surface panels, very large quantities of paint are employed for refinishing. With the rapidly increasing raw material costs for paint, and shortage of pigments and related paint materials, refinish painting as conducted in the prior art is a very substantial expense within any given factory or production line or after market.

A method of refinish painting, as contemplated in connection with the masking tape of the present invention, was disclosed in U.S. Pat. No. 3,930,069 issued Dec. 30, 1975 to the above noted inventor, that patent being titled REFINISH PAINTING METHOD and is hereby incorporated by reference.

It is further noted that spray painting is usually employed for such refinishing operations and it is common practice to mask off those surface portions of a vehicle or the like which are not to be refinished. Normally, the masked surface areas are covered with an original paint surface with which the refinish paint must match and blend. Accordingly, an additional substantial expense in such refinish painting operation lies in the time and labor required for the application of masking tape and other material over those surface portions which are not to be refinished.

SUMMARY OF THE INVENTION

Accordingly, it is an object of the present invention to provide a specially configured masking tape for facilitating refinish painting operations.

It is a further object of the invention to provide a masking tape which is specially configured in order to facilitate its application to a surface to be refinished by spray painting.

It is an even further object of the invention to provide such a masking tape which is specially configured to facilitate its application to a surface to be refinished with a longitudinal portion of the tape being angled upwardly and away from the surface. In connection with this object, a portion of the tape is angled upwardly from the surface to be refinished by an angle within the range of approximately 15° to 45°, preferably an angle of approximately 30°. To even further facilitate formation of the above noted angle in the masking tape, it is particularly contemplated that longitudinal portions of the tape be respectively adhesive coated and adhesive free, the adhesive coated portion being adapted for engagement with a surface to be refinished with the adhesive-free portion projecting angularly upwardly from the surface to be refinished.

It is also an object of the invention to provide such a masking tape having longitudinal portions which are respectively adhesive coated and adhesive-free formed upon a substrate of paper or other material which is creasable to further facilitate formation of the preferred angle.

It is yet another object of the invention to provide a masking tape of the type referred to above having longitudinal portions which are respectively adhesive coated and adhesive free, the masking tape further being scored along the juncture between the adhesive coated and adhesive-free areas to facilitate the above noted angular arrangement of the tape. In this connection, the term scored is intended to include creasing of the tape as well as perforating the tape either entirely through or partially through its thickness as well as partially cutting through the thickness of the tape along its entire length. It is to be noted that other methods of scoring the tape may be employed to similarly facilitate formation of the preferred angle between the adhesive coated and adhesive-free portions thereof.

It is yet another related object of the invention to provide a masking tape of the type referred to in the preceding paragraph arranged within a dispenser including means for scoring the tape along its juncture between the adhesive coated and adhesive-free portions during removal of the tape from the dispenser.

Additional objects and advantages of the invention are made apparent in the following description having reference to the accompanying drawings.

BRIEF DESCRIPTION OF THE DRAWINGS

FIG. 5 is one embodiment of the scoring means taken along lines 5—5 of FIG. 4;

FIG. 6 is another embodiment of the tape of the present invention;

FIG. 7 is a view taken along lines 7—7 of FIG. 6 showing the tape of the present invention; and FIG. 8 is a side view taken along lines 8—8 of FIG. 6 showing the tape of the present invention.

DESCRIPTION OF THE PREFERRED EMBODIMENTS

As indicated above, the present invention relates to a specially configured masking tape which may be employed to expose a selected surface portion of a vehicle or other surface to be refinished by spray painting. As was also indicated above, the tape is particularly suitable for defining a limited area to be refinished by spray painting. As was also indicated above, the tape is particularly suitable for defining a limited area to be refinished by spray coating to match and blend with original paint already upon surrounding portions of the surface. However, it will be apparent that the refinishing technique as well as the present specially configured masking tape may also be employed to coat other than originally painted surfaces, for example, any application where it is desirable to taper or feather the edges of a layer or coating of paint.

Figure 3:
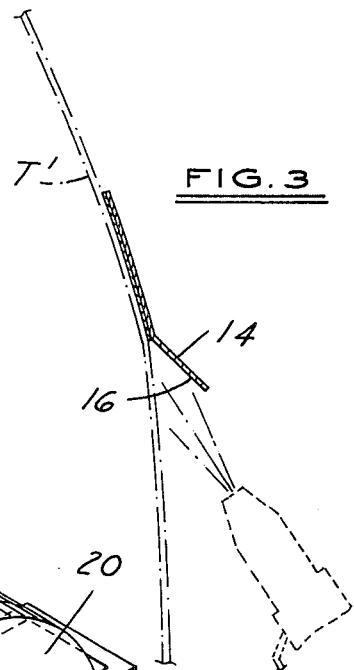
FIG. 3 shows the masking tape of the present invention applied to a portion of the vehicle of FIG. 1 during the refinish painting operation.

In order to achieve the best results in feathering or tapering the edges of a layer of coating of paint, the present masking tape is preferably arranged about the surface to be refinished with an inner edge of the tape being turned upwardly to define an included angle with the surface in the range of 15°-45° and preferably an angle of approximately 30°. This feature of the invention is best illustrated in FIG. 3.

Figure 2:
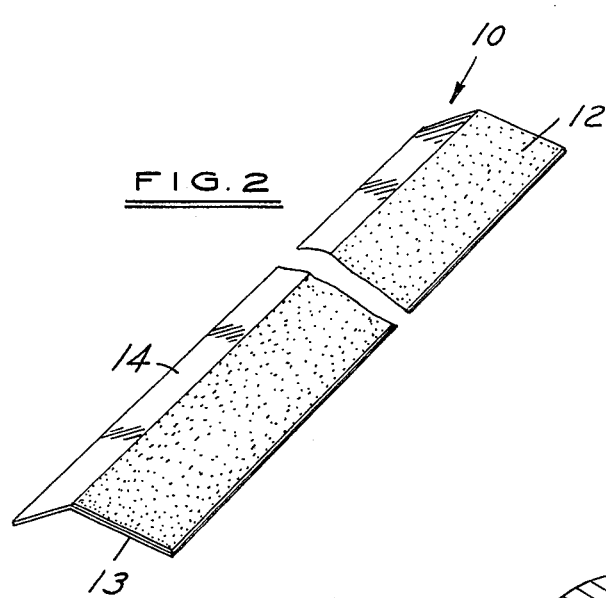
FIG. 2 is the masking tape of the present invention.
Figure 4:
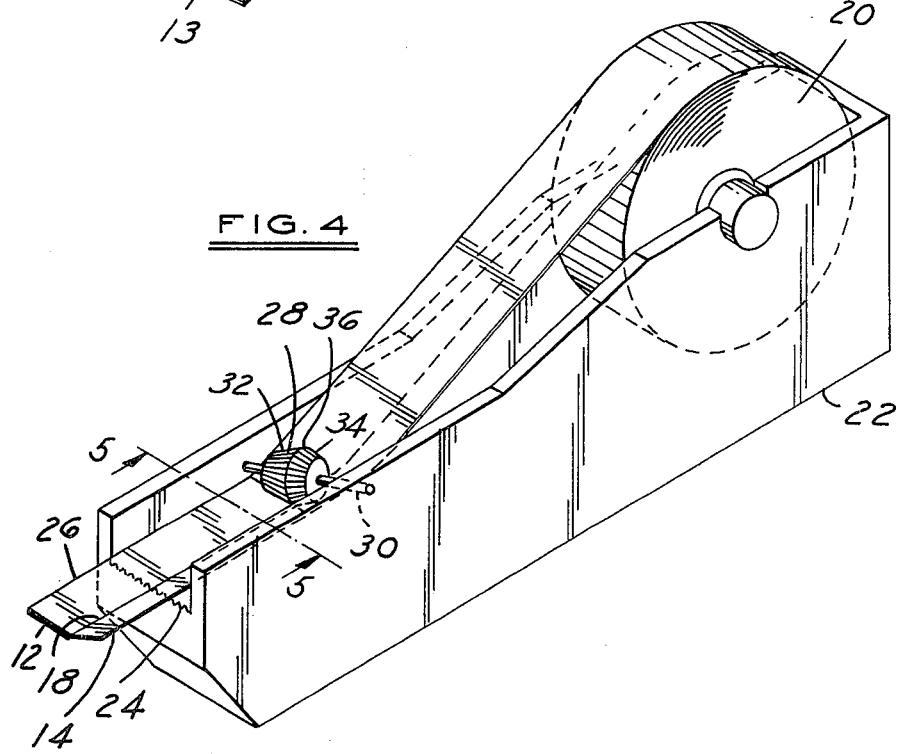
FIG. 4 is a tape dispenser of the present invention.

In order to facilitate application of the tape to a surface to be refinished to spray painting, the tape preferably includes opposed edge portions which are respectively adhesive coated and adhesive-free as illustrated in FIG. 2. The adhesive-free portion of the tape is adapted to be turned upwardly to define the included angle of 30° as illustrated in FIG. 3. In order to facilitate formation of the proper angle on the tape, it is preferable that the tape be scored, for example, by means of creasing, perforations or partial cutting, so that the adhesive-free portion of the tape may be rapidly formed into the 30° angle as illustrated in FIG. 5. One preferred method for scoring the tape and at the same time forming the angle of approximately 30° is illustrated in FIGS. 4 and 5 where the tape of the type illustrated in FIG. 2 may be scored and formed into the 30° angle during removal from a dispenser.

Figure 1:
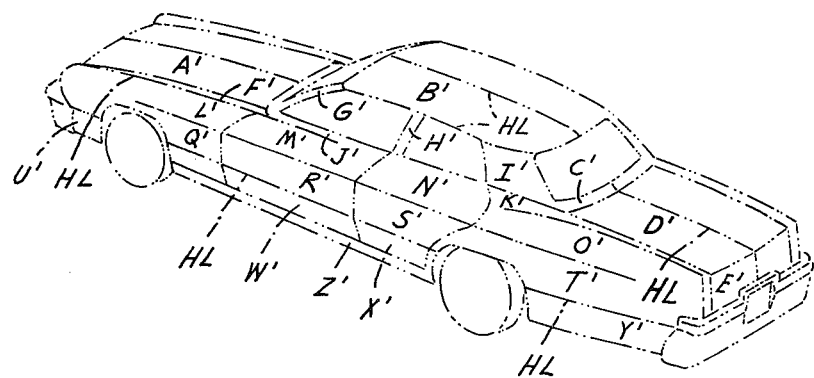
FIG. 1 is a perspective view of a vehicle, the surface of which may be refinished using the specially configured masking tape of the present invention.

Before describing the masking tape and these features in greater detail below, it is noted that the refinishing technique covered by the above noted prior patent is particularly adapted for refinishing surface portions of automobiles or the like by means of spray painting. In this connection, FIG. 1 illustrates a vehicle body, one half or one longitudinal side thereof being formed from panels designated alphabetically at A'-Z'. The panels are slightly curved and defined by highlight lines HL which may be crowned lines or the like tending to divide the panels into sections. It may also be seen that certain of the panels are divided by construction seams or joints which form a natural break or line of demarcation to particularly facilitate interruption of a coating of spray paint being applied to one panel.

Within this refinishing technique, it is not necessary to refinish an entire section of the vehicle body defined by natural seams or joints. For example, through the use of the specially configured masking tape of the present invention, a layer or coating of spray paint, even a relatively thick enamel, may be applied to any single panel as shown in FIG. 3 or even to a smaller selected portion of any one of the panels. In this manner, it is possible to decrease the area to be refinished by spray painting with resultant savings in primer surfacers, primer sealers, solvent, color or finish paint, masking tape, paper shield rubbing compounds, polishes and abrasives used in sanding and the like as well as a concomitant reduction in labor employed to prepare the surface portion for refinishing and to carry out the refinishing steps.

Generally, the refinishing technique involves enclosure of a selected surface portion with the specially configured masking tape of the present invention either by itself or in conjunction with one or more natural surface seams. The remaining surface surrounding the selected area is conventionally masked off with paper or other film. The refinishing technique then involves the spray application of an enamel or lacquer paint or other similar material with the edges of the area to be refinished being tapered or feathered by interaction of the spray paint with the tapered edge of the masking tape. It has been found that such feathering is best accomplished when an included angle of approximately 30° is formed between the angled or adhesive-free portion of the tape and the surface to be refinished.

Referring to the drawings and particularly to FIG. 2, the specially configured masking tape of the present invention is generally indicated at 10. One side of the tape 10, which engages a surface to be refinished, includes a longitudinal or lateral portion 13 coated with adhesive material 12 while a similar narrower longitudinal or lateral surface portion 14 of the tape 10 is adhesive free. The tape 10 may include a paper backing or the like as in conventional masking tape having adhesive material across one entire side or surface. Such a paper backing is of particular importance to the present invention since it may be creased and readily permits the adhesive-free portion of the tape to be angled upwardly in accordance with the preceding description. However, it is not essential that tape be formed from a paper backing. For example, the tape may also be formed from plastic film or the like which is similarly capable of being creased in order to retain an angle upon being applied to a surface to be refinished, such as Mylar (trademark of DuPont for a polyester film).

The width of the adhesive coated portion 12 is not of particularly critical importance to the present invention. The adhesive coated portion 12 need only be sufficiently wide to provide good adhesion with a surface to be refinished. The width of the adhesive free surface portion 14 is of greater importance since it is angled upwardly and away from the surface to be refinished and thus controls the access of spray paint particles to the underlying portion of the surface to be refinished. It has been found that conventional masking tape having a width of approximately three-fourths inch or 1.9 centimeters may be satisfactorily used in accordance with the present invention if only a lateral portion of one side is coated with adhesive material. For example, the width of the adhesive portion 12 may be approximately one-half with the adhesive-free portion 14 having a width of approximately one-fourth inch or 0.6 centimeters. The width of the adhesive-free portion 14 may be varied somewhat while still obtaining good feathering of spray paint applied therebeneath. For example, the width of the adhesive-free portion 14 of the tape may vary within a range of from about one-eigth inch or 0.3 centimeters to approximately one-half inch or 1.25 centimeters. With the minimum width of one-eigth inch, it becomes somewhat difficult to handle the tape and properly bend the adhesive-free portion. At the same time, with the maximum width noted above, the weight of the tape itself may prevent the adhesive-free portion of the tape from remaining in the preferred angle noted above. However, if the tape can be properly applied to a surface to be refinished and the adhesive-free portion of the tape maintained in the angular relationship noted above, proper feathering or tapering of the edge of a refinish coating of paint may be achieved.

As indicated above, a vehicle as illustrated in FIG. 1 includes a large number of surface portions, all or part of any of the surface portions possible requiring refinish painting according to the present invention. For example, the tape 10 may be placed upon one surface portion of the vehicle shown in FIG. 3. The adhesive portion 12 of the masking tape is applied to a vehicle panel such as side panel T' with the adhesive-free portion 14 of the tape being angled upwardly and away from the surface to be refinished in order to form an included angle 16 of approximately 30°. Since the vehicle is to be refinished by spray painting, the remainder of the vehicle surrounding the portion to be painted is covered with paper or the like in conventional fashion so that only the panel to be refinished painted is exposed.

During the painting, particles of spray paint tend to drift under the angled portion 14 of the tape and provide a tapered or feathered edge for a coating of paint applied to the area.

During the refinishing process noted above, the paint may be applied in a conventional spray application. Also, solvent may be employed to facilitate the feathering or tapering of the paint surface beneath the angled tape portion 14. This element of the process is described in the above noted patent.

After completion of the refinish painting, the tape may be removed after the paint is substantially dry. Any remaining edge or seam where the refinish coat of paint overlies the original coat of paint may be blended by rubbing with a suitable rubbing compound. However, it has been found that use of the specially configured masking tape disclosed herein in conjunction with a refinishing spray coating technique such as that described in the above noted patent causes the edges of the refinish paint coat to be feathered down to substantially zero thickness beneath the angled tape portion 14. Accordingly, as noted above, only a small portion of the vehicle body need be painted in such a refinishing operation.

The tape 10 may be applied to the surface to be refinished in a number of ways. For example, the tape may be simply applied to the surface with the adhesive-free portion 14 raised into the angular configuration noted above. Because of the creasable characteristics of the substrate or the masking tape as noted above, the tape portion 14 tends to remain in that angle.

In order to facilitate application of the tape, it is particularly contemplated that the tape be scored along the line 18 defined between the adhesive coated portion 12 and adhesive-free portion 14 of the tape. As noted above, the particular mode of scoring the tape may consist in forming perforations in the tape along the line 18 or cutting the tape on one side to facilitate its being formed into the angular configuration illustrated in FIGS. 4 and 5. The tape may also be permanently scored into the angular position by heat treating the plastic backing 13 and 14 to form the desired crease.

It has been found within the present invention that the specially configured tape of the present invention may be creased or scored during removal from a dispenser in order to even further facilitate formation of the angular configuration noted in FIG. 2. For example, referring to FIGS. 4 and 5, the tape 10 is illustrated as being arranged in a supply means as a roll 20 within a dispenser 22 of the present invention. The dispenser 22 includes a cutting means as a cutoff edge 24. With the cutoff edge 24 being arranged for engagement with the side of the tape having the adhesive coated portion 12, the tape may be pulled across the cutoff edge 24. Downward pressure applied to the tape at the cutoff edge allows the tape to be severed at any point along its length.

Within such a dispenser, the tape may be creased along the line 18 while it is being unrolled from the dispenser. For example, scoring or creasing may be accomplished by a pointed projection on the dispenser arranged generally in spaced apart relation from the cutoff edge 24 and the supply means 20. An example of a scoring means 28 in a wheel or roller rotatably mounted on a shaft 30 positioned in the width of the dispenser. The roller 28 is arranged along the width of the dispenser so that it engages approximately with line 18 on the tape. Thus, as the tape 10 is being unrolled from the dispenser, it is pulled under the roller 28 causing a crease to be applied to the tape 10 along the line 18 and on the opposite side of the tape from the adhesive coated portion 12. In this manner, an angle of 30°, for example, may be formed between the adhesive-free tape portion 14 and the adhesive coated portion 12. After a length of tape is removed from the dispenser and drawn under the roller 28, it may be cut off by the edge 24 and applied directly to a surface to be refinished.

The roller 28 mounted on the shaft 30 is comprised preferably of two segments. Relatively, the two segments 32 and 34 are angled with respect to each other and converge at the point 36. The point 36 is preferably a sharpened or serrated edge or a knife which will score the tape at point 18. The wheel segment 32 engages the back side of the tape 26 which is opposite to the adhesive portion 12 of the tape. Wheel segment 34 engages the back side 27 of the adhesive-free portion of the tape 14. The roller 28 may be comprised of any scoring means which can achieve the desired perforation or scoring of the tape 10. The roller may be a metal or a highly sharpened plastic.

FIG. 5 shows the roller to be comprised of lands and grooves thereby providing a serrated edge 36. FIG. 5 also shows the shaft 30 being angularly mounted in the dispenser 22 to assist in cutting or perforating the tape 10 to the desired angle without a buildup of materials due to the scoring operation.

The tape of the present invention may also be supplied in pre-cut angled condition ready for sale. An example of such a tape is shown in FIG. 6 where the tape 10 has the adhesive portion 12 and the adhesive-free portion 14. In addition, there is a cover 40 which is adhered to the adhesive 12 so that a plurality of tapes 10 may be packaged in a desired container without the tapes sticking or adhering to each other. In this instance, the tape of the desired length may be pulled from cover removed from the adhesive backing, and then the adhesive portion applied to the vehicle in order for the refinished painting method to be followed. As can be seen, the removable cover 40 protects the adhesive character of the tape during storage of the package of tapes.

It is again emphasized that the specially configured masking tape of the present invention may be employed in a variety of spray painting operation where it is desirable to apply paint only to a limited surface portion. Such spray painting applications are most commonly encountered for example in the refinishing of vehicle body portions as illustrated in FIG. 3. In such an application, the specially configured masking tape of the present invention together with the refinish painting method of the above noted patent may be employed in both OEM (Original Equipment Manufacture) and after-market applications. Where high temperature bake ovens are employed, the tape 10 may be formed with a specially selected backing and adhesive as compared, for example, to tape used in air drying applications to assure that the adhesive is not transferred to the vehicle body.

It will be further understood that numerous variations and modifications are possible within the specially configured masking tape in addition to those described above within the scope of the present invention. Accordingly, the scope of the present invention is defined only by the following appended claims.

I claim:

1. A method of refinish painting a panel having a demarcation line between angularly related panel portions, one of which is to be refinish painted, comprising:

creasing a strip of tape completely along the length thereof, the tape comprised of a securing means to attach the tape to the panel surface yet to allow for later removal and a flexible elongated strip to provide angularly related longitudinally extending tape portions with the crease maintaining the portions in their angular relationship, applying said tape to the panel with the crease line disposed at the demarcation line of the panel and with one strip portion adhered by the securing means to one side of the line on the panel portion not to be refinish painted and the other tape portion extending over and angularly upwardly away from the panel portion to be refinish painted, to form an included angle within the range of approximately 15° to approximately 45°, and spraying a layer of paint on the panel to be refinish painted and beneath the upwardly angled tape portion.

* * * * *